(12) United States Patent
Cors et al.

(10) Patent No.: US 9,215,128 B2
(45) Date of Patent: *Dec. 15, 2015

(54) PORT MEMBERSHIP TABLE PARTITIONING

(71) Applicant: International Business Machines Corporation, Armonk, NY (US)

(72) Inventors: Josep Cors, Rochester, MN (US); Ward R. Nelson, Stewartville, MN (US); Jun C. Yin, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 341 days.

This patent is subject to a terminal disclaimer.

(21) Appl. No.: 13/829,228

(22) Filed: Mar. 14, 2013

(65) Prior Publication Data

US 2014/0280826 A1    Sep. 18, 2014

(51) Int. Cl.
| H04L 12/28 | (2006.01) |
| H04L 12/24 | (2006.01) |
| H04L 12/18 | (2006.01) |
| H04L 12/46 | (2006.01) |
| H04L 29/06 | (2006.01) |

(52) U.S. Cl.
CPC ............... *H04L 41/00* (2013.01); *H04L 12/18* (2013.01); *H04L 12/4641* (2013.01); *H04L 41/0893* (2013.01); *H04L 63/00* (2013.01); *H04L 12/1881* (2013.01); *H04L 63/0263* (2013.01); *H04L 63/101* (2013.01)

(58) Field of Classification Search
CPC .......................... H04L 41/00; H04L 41/0893
USPC .................................. 370/432, 392, 389, 390
See application file for complete search history.

(56) References Cited

U.S. PATENT DOCUMENTS

| 6,138,185 | A | * | 10/2000 | Nelson et al. | 710/33 |
|---|---|---|---|---|---|
| 6,986,015 | B2 | | 1/2006 | Testardi | |
| 6,999,774 | B2 | | 2/2006 | Idnani et al. | |
| 7,099,317 | B2 | | 8/2006 | Ambe et al. | |
| 7,317,722 | B2 | * | 1/2008 | Aquino et al. | 370/390 |
| 7,327,730 | B2 | | 2/2008 | Chen et al. | |
| 7,333,491 | B2 | | 2/2008 | Chen et al. | |
| 7,512,078 | B2 | | 3/2009 | Swain et al. | |
| 7,787,369 | B2 | | 8/2010 | Swain et al. | |
| 7,826,447 | B1 | | 11/2010 | Bishara et al. | |
| 7,860,121 | B2 | * | 12/2010 | Chen | 370/432 |
| 7,961,729 | B2 | | 6/2011 | Gainey, Jr. et al. | |
| 7,965,716 | B2 | | 6/2011 | Takacs | |
| 8,170,191 | B2 | * | 5/2012 | Potekhin et al. | 379/202.01 |
| 8,677,439 | B2 | * | 3/2014 | Sun et al. | 725/120 |
| 8,743,894 | B2 | * | 6/2014 | Fomin et al. | 370/402 |
| 2005/0105560 | A1 | | 5/2005 | Mann et al. | |
| 2006/0133376 | A1 | * | 6/2006 | Valdevit | 370/390 |
| 2012/0020373 | A1 | | 1/2012 | Subramanian et al. | |
| 2012/0311670 | A1 | * | 12/2012 | Johnsen et al. | 726/3 |

* cited by examiner

*Primary Examiner* — Rasheed Gidado
(74) *Attorney, Agent, or Firm* — Patterson + Sheridan, LLP

(57) ABSTRACT

A firmware model is provided for a shared port membership table that is partitioned for different needs of a distributed network switch, such as broadcast groups, multicast groups, ACL rules, and other port membership groupings. The shared port membership table enables a control point to set the size of each of the types of port membership information based on their usage or expected usage. By shrinking one partition, the control point is able to use the port group entries for a different partition of port group information.

13 Claims, 4 Drawing Sheets

PORT MEMBERSHIP TABLE PARTITIONING

BACKGROUND

Embodiments of the invention generally relate to the field of computer networks.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or Peripheral Component Interconnect Express (PCIe) slots as well as permit communication between servers in the same or different chassis. In addition, multiple switches may also be combined to create a distributed network switch.

In computer networking, packets or frames may be sent from a source to one or more destinations using, among other approaches, unicast, broadcast, and multicast routing schemes. A unicast transmission refers to one-to-one sending of a message to a single network destination identified by a unique address. A multicast transmission refers to a one-to-many communication to a group of network destinations simultaneously in a single transmission from the source. Broadcasting refers to transmitting a packet that will be received by every destination on a network, typically limited to a particular broadcast domain.

BRIEF SUMMARY

Embodiments of the invention provide a method, product, and system for performing an operation for managing port membership information in a distributed network switch having a plurality of switch modules. In one embodiment, the method includes receiving a request indicating a partition size associated with a type of port membership information, and modifying a port membership table based on the partition size. The port membership table may include a first plurality of entries of a first type of port membership specifying port membership for multicast groups and a second plurality of entries of a second type of port membership specifying port membership for broadcast groups.

Figure 1:
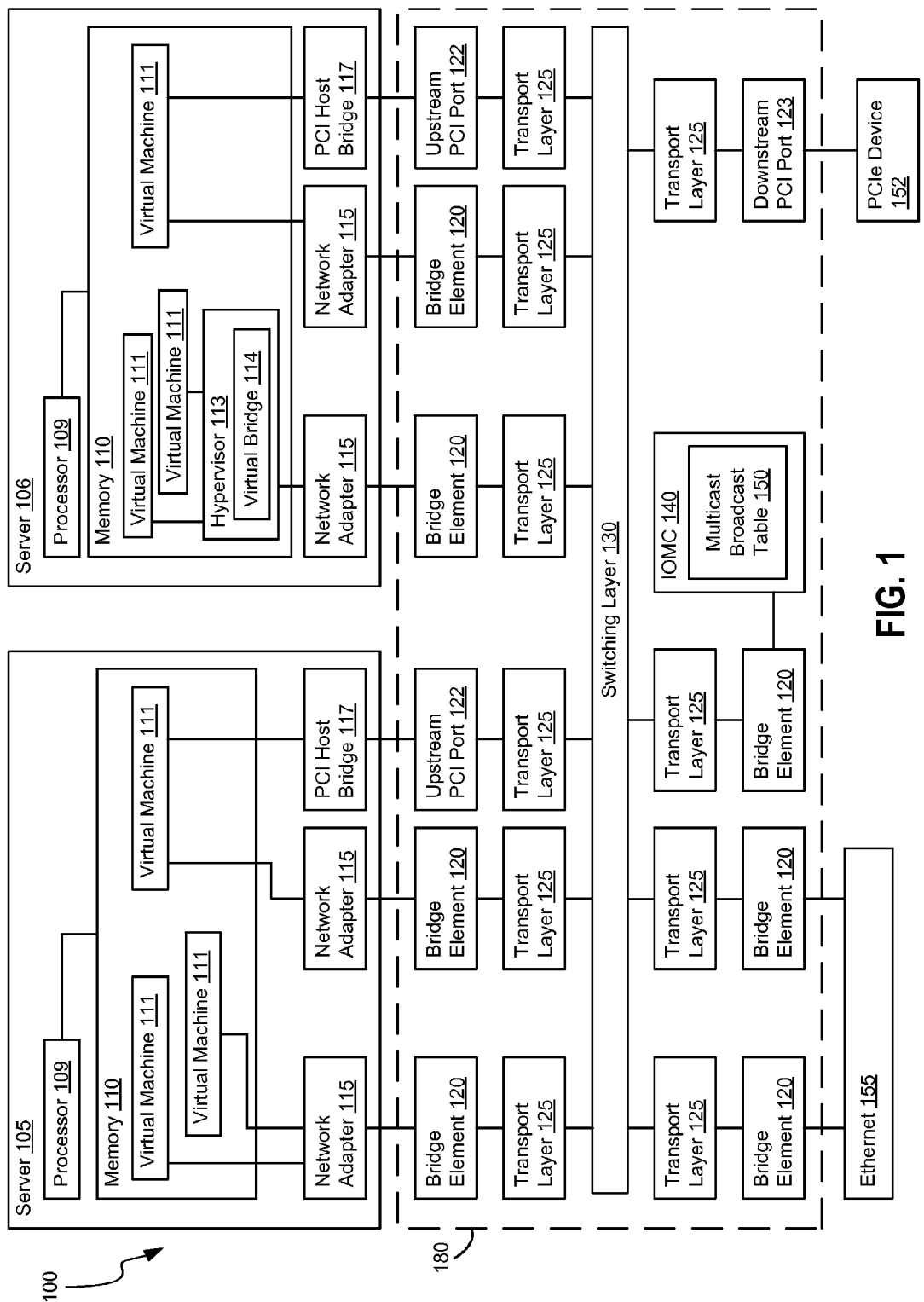
FIG. 1 is a block diagram of a system having a distributed network switch configured to route data frames in a distributed manner, according to one embodiment of the invention.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Embodiments of the present invention provide a firmware model of a multicast broadcast table that partitions the table for different needs of a distributed network switch. For example, port membership for broadcast domains may be needed to forward frames to all port members, and VLAN broadcast domain, to forward frames to ports belonging to a VLAN membership. Additionally, some Ethernet bridge protocols require specific membership, such as Internet Group Management Protocol (IGMP) may define a port belonging to a multicast tree. As such, a control point is allowed to set the size of each of the types of port membership information based on their usage or expected usage within a single, shared port membership table (also referred to as a multicast broadcast table, or MCBC table). By shrinking one partition, the control point is able to use the port group entries for a different partition of port group information. The control point may export the ability to manage these groups to network administrators. For example, the MCBC table may be partitioned to allow a larger group for multicast purposes and reduce the number of VLANs needed. Unlike traditional approaches that have a fixed number of VLANs, IGMP groups, and other port groups, embodiments of the present invention advantageously provides a network administrator with the ability to set the size of port groupings (e.g., partitions) to meet each particular need and use case.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a system architecture 100 that includes a distributed network switch 180, according to one embodiment of the invention. The computer system 100 includes a first and second server 105, 106 connected to the distributed network switch 180. In one embodiment, the first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105. The server 105 may operate under the control of an operating system (not shown) and execute various computer software applications, components, programs, objects, modules, and data structures, such as virtual machines 111.

The server 105 may include network adapters 115 (e.g., converged network adapters, or CNAs). A converged network adapter may include single root I/O virtualization (SR-My) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fibre Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the distributed network switch, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

As shown in FIG. 1, the second server 106 may include a processor 109 coupled to a memory 110 which includes one or more virtual machines 111 similar to those found in the first server 105. The memory 110 of server 106 may include a hypervisor 113 configured to manage data shared between different virtual machines 111. The hypervisor 113 may include a virtual bridge 114 that allows direct communication between connected virtual machines 111 rather than requiring the virtual machines 111 to use the bridge elements 120 or switching layer 130 to transmit data to other virtual machines 111 communicatively coupled to the hypervisor 113.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that are coupled to one of the bridge elements 120, also referred to herein as bridging elements. Additionally, to facilitate PCIe communication, the server may have a PCI Host Bridge 117. The PCI Host Bridge 117 may connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCIe device 152.

The distributed network switch 180 includes a plurality of bridge elements 120 that may be located on a plurality of a separate, though interconnected, hardware components. In one embodiment, the bridge elements 120 may be configured to forward data frames throughout the distributed network switch 180. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180. From the perspective of the network adapters 115, the distributed network switch 180 acts like one single switch even though the distributed network switch 180 may be composed of multiple switches that are physically located on different components, such as on different chassis or racks. Distributing the operations of the network switch 180 into multiple bridge elements 120 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

In one embodiment, the switching layer 130 may comprise a local rack interconnect (LRI) which connects bridge elements 120 located within the same chassis and rack, as well as links that connect to bridge elements 120 in other chassis and racks.

After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 152. The PCIe device 152 may be a passive backplane interconnect, as an expansion card interface for add-in boards, or common storage that can be accessed by any of the servers connected to the distributed network switch 180.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130. Although one IOMC 140 is shown, the system 100 may include a plurality of IOMCs 140. In one embodiment, IOMCs 140 may be arranged in a hierarchy such that one IOMC 140 is chosen as a master while the others are delegated as members. In another embodiment, the IOMCs 140 may be arranged in a peer-to-peer layout where the IOMCs 140 collaborate to administer and manage the elements of the distributed network switch 180.

In one embodiment, the IOMC 140 may include a port membership table, referred to herein as a multicast broadcast (MCBC) table 150, that stores information relating to groupings of ports, also referred to as port groups, or port membership. In some embodiments, the MCBC table 150 stores a plurality of types of port membership information. The MCBC table 150 may be shared by a plurality of bridge elements 120. In one embodiment, the port membership information in the MCBC table 150 may be used to update the bridge elements 120. For example, each bridge element 120 is configured to send a port membership lookup request to the MCBC table 150, and the MCBC table is configured to send information related to ports that are members of a requested group (e.g., multicast, broadcast).

Figure 2:
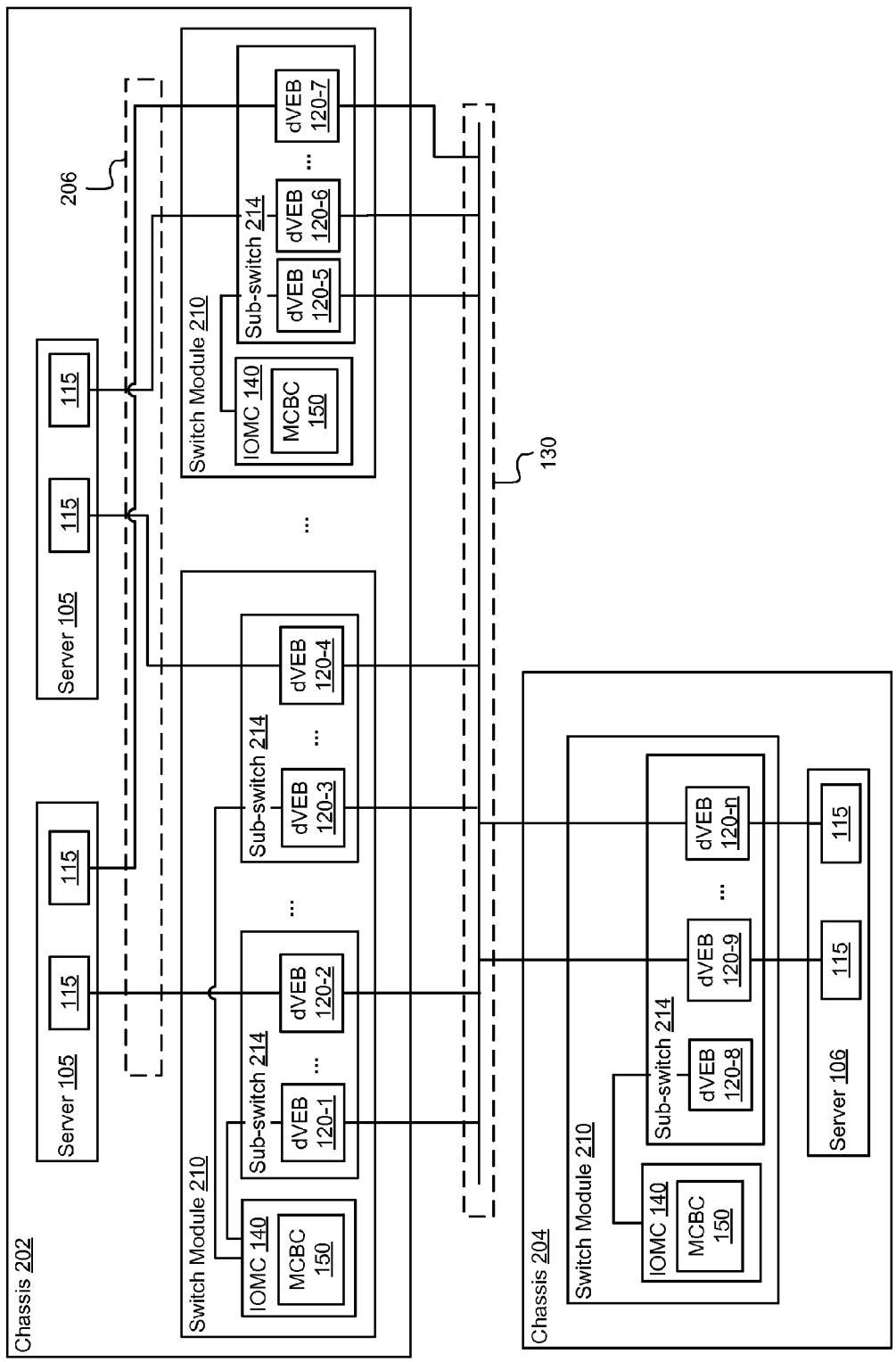
FIG. 2 is a block diagram of the distributed network switch having a plurality of bridge elements, according to one embodiment of the invention.

FIG. 2 illustrates the distributed network switch 180 having a plurality of bridge elements 120 connected to servers, according to one embodiment of the invention. As shown, a plurality of servers 105 may be physically located in the same chassis 202, and another server 106 may be physically located in a different chassis 204. It should be recognized that the chassis 202 and 204 may include any number of servers. As shown in FIG. 2, the plurality of bridge elements 120 are organized into a plurality of switch modules 210 and sub-switches 214 physically located and distributed across different chassis 202, 204. In one embodiment, the distributed network switch 180 disclosed herein is configured to provide Layer 2 Ethernet switching via multiple switch modules 210, the switching layer 130 interconnecting the switch modules 210, and management firmware executing on a management controller, such as IOMCs 140. Doing so may eliminate the need for stand-alone Ethernet switches to interconnect processing elements in the servers 105, 106. As such, a system networked using the distributed network switch 180 may also be augmented in a granular and scalable manner by adding individual components such as switch modules 210 or other processing elements.

In one embodiment, a switch module 210 (e.g., chassis interconnect elements) may be a physical switch unit configured to provide network bridging for the distributed network switch 180. In one embodiment, the switch modules 210 and sub-switches 214 are hardware components (e.g., PCB boards, FPGA boards, system on a chip, etc.) that provide physical support and connectivity between the network adapters 115 and the bridge elements 120. In general, the switch modules 210 include hardware that connects different chassis 202, 204 and servers 105 and 106 in the system illustrated. While switch modules 210 are configured as a Layer 2 Ethernet bridge for routing data frames (e.g., based on MAC address) in the embodiment described herein, it should be recognized that embodiments of the present disclosure may be applied to other forms of packet switching.

In one embodiment, the switch module 210 includes an IOMC 140 and one or more sub-switches 214. In one embodiment, an IOMC 140 for a given switch module 210 maintains a multicast broadcast (MCBC) table 150 shared by bridge elements 120 of a sub-switch 214. In some embodiments, the IOMC 140 may maintain a MCBC table 150 for each sub-switch 214 in the switch module 210. In one embodiment, the MCBC table 150 includes port data that is registered and maintained through communication and cooperation with the bridge elements 120, and in some cases, the servers 105 and 106. In some embodiments, the MCBC table may be configured similarly to the MCBC table shown in FIG. 1, where each switch module 210 is configured to maintain a synchronized copy of the MCBC table to give local bridge elements access to the entire MCBC table with low latency and rapid response times.

In one embodiment, the sub-switches 214 may include a logical or physical grouping of bridge elements 120. Each bridge element 120 may be a distributed Virtual Ethernet bridge (dVEB) configured to forward data frames throughout the distributed network switch 180 based on ports groups stored in the MCBC table 150. In one embodiment, the bridge elements 120 are managed by firmware executing on the IOMC 140. In the embodiment shown, at least one bridge element 120 in the sub-switch 214 may be connected to an IOMC 140 to give the IOMC access to the switching layer 130.

The bridge elements 120 are operatively connected to multiple bridge elements 120. In one embodiment, the bridge elements 120 are connected to each other using the switching layer 130 (e.g., via a mesh connection schema). As such, no matter the bridge element 120 used, a data packet can be routed to another bridge element 120 located on any other switch module 210. In some embodiments, this may be accomplished by directly connecting each bridge element 120, i.e., each bridge element 120 having a dedicated direct data path to every other bridge element 120. Alternatively, in some embodiments, the switching layer 130 may use a spine-leaf architecture wherein each bridge element 120 (i.e., a leaf node) is attached to at least one spine node. The spine nodes route data packets received from the bridge elements 120 to the correct spine node, which then forward the data packet to the correct bridge element 120. In one embodiment, the bridge elements 120 may forward data frames to other bridge elements 120 in the same sub-switch 214, in different sub-switches 214 of the same switch module 210, or even in different switch modules 210 via switching layer 130.

In the embodiment shown, each bridge element 120 has at least two ports, one port connecting to the switching layer 130 and another port connected to the servers 105 and 106 (e.g., via network adapters 115). The bridge elements 120 may forward data frames transmitted by the network adapter 115 to the switching layer 130. In one implementation, a network adapter 115 and bridge element 120 may be connected using two 40 Gbit Ethernet connections or one 100 Gbit Ethernet connection. In one example, assuming a switch module 210 includes four sub-switches 214, each sub-switch 214 having five bridge elements 120, and each bridge element 120 having two ports connected to a server and to the switching layer 130, an entire switch module 210 may have at least 40 ports (e.g., 2×5×4=40) for receiving and forwarding data frames within the distributed network switch 180.

In operation, upon receiving an Ethernet frame at an ingress port, a bridge element 120 forwards the Ethernet frame to an internal port or an external port. In some embodiments, the Ethernet frame may be a data frame or a control frame, which carries control information related to managing operation of the distributed network switch. Depending on the type of frame is received, a different form of distribution may be needed (e.g., unicast, multicast, broadcast). In one embodiment, upon receiving an Ethernet frame at an ingress port, a bridge element 120 may access the MCBC table 150 based on the type of the Ethernet frame to request port membership information relating to a plurality of destination ports to which copies of the Ethernet frame should be sent. For example, upon receiving an Ethernet frame having a multicast destination address, a bridge element 120 accesses the MCBC table 150 to get a list of destination ports associated with the multicast destination address to which a copy of the Ethernet frame should be sent. In another example, upon receiving an Ethernet frame specifying a broadcast address (e.g., FF:FF:FF:FF:FF:FF), the bridge element 120 accesses the MCBC table 150 to get a list of destination ports belonging to a given virtual local access network (VLAN) and/or logical network (LN) domain to which the broadcast frame should be sent.

In conventional hardware implementations, Ethernet bridges used separate port membership tables with specific, pre-defined uses. However, this limited the bridge networking to pre-determined table sizes for each use case, such as a certain maximum amount for a broadcast table. Accordingly, embodiments of the present invention provide a common large block that can be partitioned and managed by different subsystems of the distributed network switch. Embodiments of the present invention provide firmware configured to dynamically partition and manage the common large block embodied as a multicast broadcast table 150. As such, the multicast broadcast table, according to embodiments described herein, advantageously provides flexibility to support a variety of use cases and support on-demand growth of a network.

Figure 3:
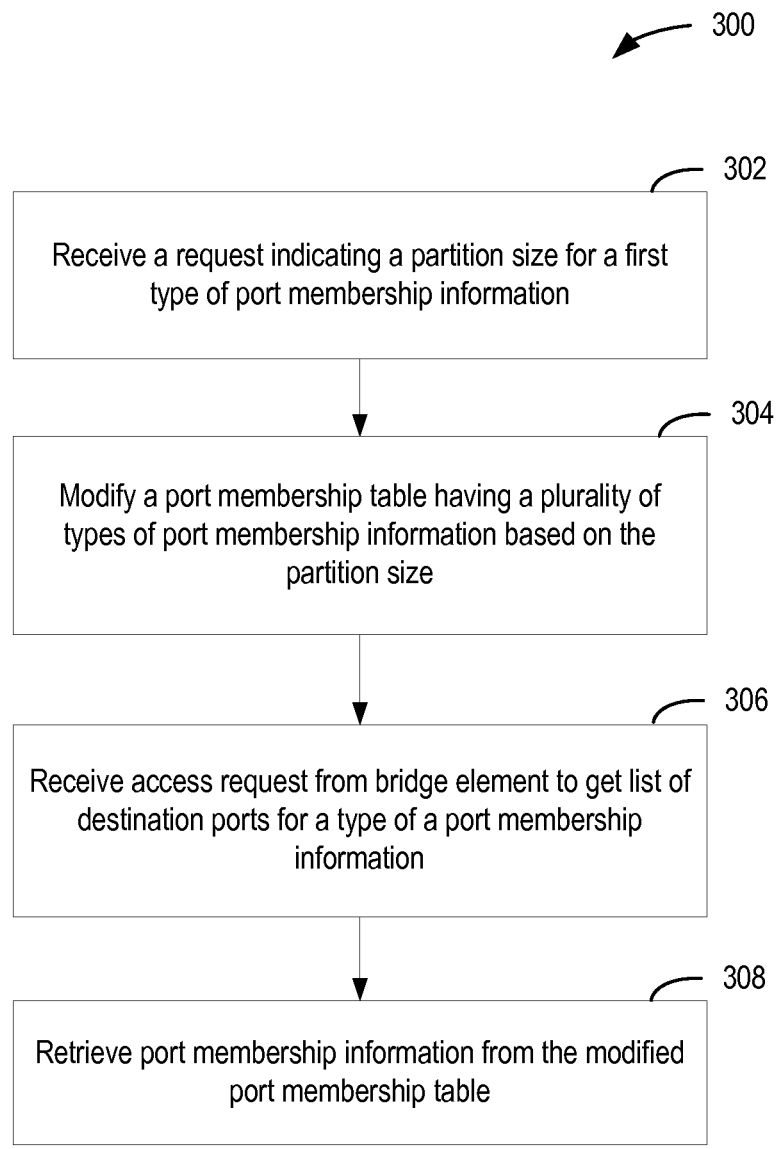
FIG. 3 is a flowchart depicting a method for managing port membership information for forwarding frames in a distributed network switch, according to one embodiment of the invention.

FIG. 3 is a flowchart depicting a method 300 for managing port membership information for forwarding frames in a distributed network switch, according to one embodiment of the invention. The method 300 (e.g., as implemented in firmware) described herein allows a control point (e.g., IOMC 140) to set a size of each of a plurality of types of port membership based on the respective usage of the types. For example, by shrinking one group's partition, the IOMC 140 is able to use that group's entries for a different group's partition. As such, the IOMC 140 may export the ability to manage these groups to network administrators (e.g., via software) to, for example, allow a larger group of port membership entries for multicast purposes and reduce a number of VLANs required.

As shown, the method 300 begins at step 302, where the IOMC 140 receives a request indicating a partition size for a first type of port membership information. In some embodiments, the partition size may indicate a number of port membership entries associated with a first type of port membership information. For example, the request may specify a partition size of 4,096 entries for broadcast entries. In other embodiments, the partition size may indicate an amount of memory within the MCBC table 150 to be allocated to a particular type of port membership information. Examples of types of port membership information that may be partitioned may include port membership related to broadcasting, port membership related to multicasting, multicast router information, Internet Group Management Protocol (IGMP) information, port memberships related to execution of access control list (ACL) rules, Spanning Tree Group (STG) information, Fibre Channel over Ethernet (FCoE) information, and other system rules.

At step 304, the IOMC 140 modifies a port membership table (e.g., MCBC table 150) having a plurality of types of port membership information based on indicated partition size. In some embodiments, the IOMC 140 modifies the MCBC table 150 to update a size of a first partition associated with a first type of port membership information based on the received request indicating a partition size for the first type. For example, the IOMC 140 may modify the MCBC table 150 to grow (or shrink) a first partition associated with port membership information for multicasting based on the received request. In some embodiment, the IOMC 140 may modify a number of entries of a first type of port membership based on the partition size, wherein the partition size is associated with the first type of port membership.

In some embodiments, the IOMC 140 may further modify other partitions of the MCBC table 150 to accommodate changes to one partition of port membership information, based on a total maximum size of the MCBC table 150. For example, the IOMC 140 may grow a first partition associated with multicast port membership, while shrinking a second partition associated with broadcast entries to satisfy a condition of a total maximum number of entries in the MCBC table 150. In another example, the IOMC 140 may grow/shrink a first partition, while shrinking/growing, respectively, a second partition associated with unused entries.

In some embodiments, modifications of the MCBC table may be implemented as changes to a model that represents the MCBC table 150. The model (e.g., stored in memory) tracks the partitions for the different types of port membership. In some embodiments, the model may include a plurality of starting addresses and lengths, each starting address and length corresponding to a type of port membership information. In some embodiments, the starting addresses may be an index offset relative to the MCBC table 150. For example, a first partition corresponding to broadcast membership may have a starting address of [00000] and a length of 32 k entries. A second partition corresponding to multicast membership may then have a starting address of [32000] and a length of 4 k entries.

At step 306, the IOMC 140 receives an access request (e.g., from a bridge element) to get a list of destination ports for a type of port membership information. The access request may specify a membership identifier (MID) associated with an entry in the MCBC table 150. The access request may further specify a type of port membership information associated with the MID (e.g., broadcast group, multicast router). In some embodiments, the MID may be determined according to calculations described in greater detail below, or by another information table referencing the MCBC table 150.

At step 308, responsive to the access request, the IOMC 140 retrieves port membership information from the modified port membership table. In some embodiments, the IOMC 140 retrieves the requested port membership information from the MCBC table 150 using an updated starting address associated with the type of port membership information requested.

In one embodiment, the MCBC table 150 may have an initialized state comprised of pre-determined default sizes for each partition corresponding to a type of port membership information. As such, responsive to a request indicating a partition size for a type of port membership information, the IOMC 140 may modify the initial, default partition size of the partition in the MCBC table 150. While embodiments of the present invention contemplate modification of a port membership table during an initial setup of the distributed network switch, it should be recognized that embodiments may be configured to dynamically modify partitions of the port membership table during live operation of the distributed network switch according to techniques described herein.

Figure 4:
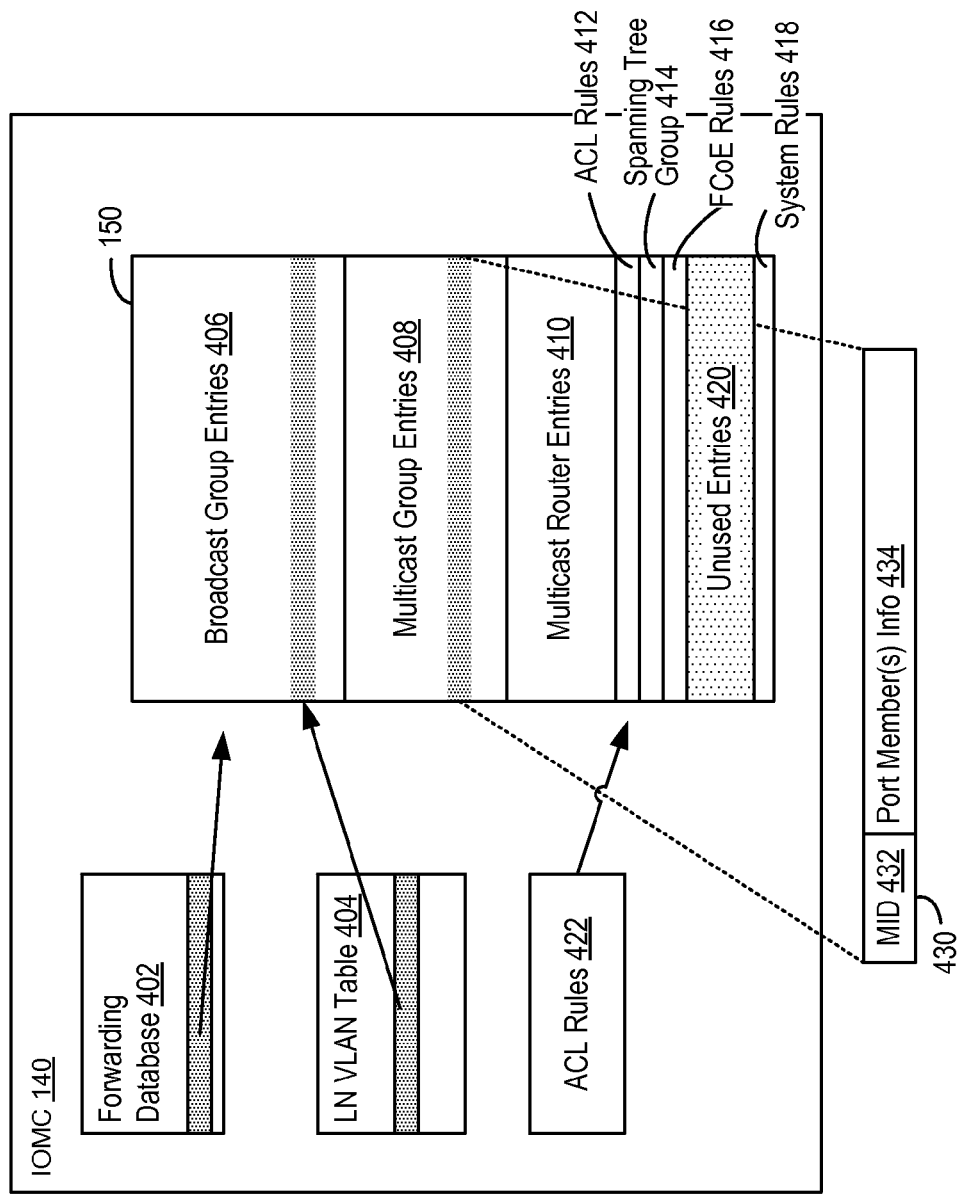
FIG. 4 is a block diagram illustrating a multicast broadcast table having partitions for storing various types of port membership information, according to one embodiment of the invention.

FIG. 4 is a block diagram illustrating in greater detail one embodiment of the MCBC table 150 having a plurality of entries 430 for various types of port membership information. In one embodiment, each entry 430 of the MCBC table 150 may be referenced by a membership identifier (MID) 430 that uniquely identifies the entry 430 within the MCBC table. In some embodiments, the MID 432 may be an index offset value relative to the MCBC table 150 (e.g., 0 to 63,999). In other embodiments, the MID 432 may be an index offset value relative to a particular partition in the MCBC table 150 (e.g., a $9^{th}$ entry in the broadcast group entries 406).

In one embodiment, each entry 430 further includes port member(s) information 434 that specifies one or more ports of the distributed network switch that are members of a group corresponding to that entry. A variety of implementations, and combinations thereof, for specifying member ports of a group are contemplated. In some embodiments, port member information 434 may include an enumerated list of port identifiers (e.g., an identifier comprised of Chip-DVEB-Port-Logical-port, or CDPL, information). In another embodiment, port member information 434 may be specified in a cascading multi-tiered scheme that specifies (1) local ports associated with the IOMC 140 that are members of the group corresponding to the entry 430, and (2) other neighboring IOMCs that are associated with ports that are members of the group.

In the embodiment shown, the MCBC table 150 is partitioned into broadcast group entries 406, multicast group entries 408, multicast router entries 410, ACL rule entries 412, STG group entries 414, FCoE rules 416, system rules 418, and unused entries 420. It should be recognized that embodiments of the present invention may include other suitable types of port membership information other than those example types enumerated above. It should be further recognized that the partitions shown in FIG. 4 are rendered having example sizes for illustration purposes only and that the MCBC table 150 may be configured to have a variety of initial and modified partitions for port membership information.

In one embodiment, the MCBC table 150 includes a partition having a plurality of broadcast group entries 406 that specify destination ports associated with a particular virtual local access network (VLAN) and with a particular logical network (LN) domain. In many cases, a bridge element 120 may need to broadcast an Ethernet frame, that is, forward copies of the Ethernet frame to all ports that are members of a VLAN and LN domain. For example, a bridge element 120 may receive an Ethernet frame specifying a broadcast address (e.g., FF:FF:FF:FF:FF:FF). In another example, the bridge element 120 may need to flood a an Ethernet frame's VLAN and LN domain with the frame, if a forwarding database 402 does not have a port corresponding to the frame's destination MAC address. The bridge element 120 may access the MCBC table 150 to retrieve a broadcast group entry 406 corresponding to the VLAN and LN domain of the received Ethernet frame and get a list of destination ports belonging to the VLAN and LN domain to which the broadcast frame should be sent. The retrieved broadcast group entry 406 includes port member information 434, as described above, that specifies ports that are members of the VLAN and LN domain.

In some embodiments, the broadcast group entry 406 may be retrieved by reference from other information tables of the IOMC 140, such as a LN/VLAN table. As shown in FIG. 4, the IOMC 140 may include a LN/VLAN table 404 (sometimes referred to as a LNVT) that maps VLANs and LNs to a particular broadcast group entry 406 within the MCBC table 150. The LNVT 404 may reference a broadcast group entry 406 (e.g., via a MID 432) that specifies ports that are members of the VLAN (e.g., VLAN0).

In other embodiments, a MID 432 for a broadcast group entry 406 that is associated with a given VLAN and LN domain may be determined based on the values of the VLAN and LN domain. In some embodiments, a broadcast group MID may be calculated as $MID_{BC}=START\_ADDR_{BC}+(LN\_tag*N_{VLAN}\ VLAN\_tag)$, where the LN and VLAN domain is identified by numeric values LN_tag and VLAN_tag, $N_{VLAN}$ is the number of VLANs per LN, and $START\_ADDR_{BC}$ represents a starting address for the block of broadcast group entries 406 within the MCBC table 150. For example, in an implementation where each LN may be associated with any of 4,096 VLANs, and that the broadcast group entries are at the beginning of the MCBC table (e.g., starting address is 0), as shown in FIG. 4, broadcast group MIDs may be determined as $MID_{BC}=(LN\_tag*4096+VLAN\_tag)$.

The MCBC table 150 includes one or more partitions having a plurality of entries configured to support multicast group routing. In one embodiment, the MCBC table 150 includes a partition having a plurality of multicast group entries 408 that specify destination ports that are members of a particular multicast domain (e.g., as specified by the IGMP protocol). In one embodiment, the MCBC table 150 includes a partition having a plurality of multicast router entries 410 that specify destination ports associated with one or more multicast routers, which are modules that connect separated multicast domains, such as switch units of another distributed network switch external to the switch modules 210. In some embodiments, the multicast router entries 410 may be managed by higher level processes (e.g., software) or a network operating system (NOS). In one embodiment, the multicast router entries 410 and multicast group entries 408 may share a common partition managed by NOS.

In operation, for example, upon receiving a multicast Ethernet frame, the bridge element 120 accesses the MCBC table 150 to retrieve a multicast group entry 408 corresponding to the multicast domain specified by the received frame. The retrieved multicast group entry 408 includes port member information 434 that specifies one or more ports that are members of the multicast domain and to which the multicast Ethernet frame should be copied and forwarded. In some cases, upon receiving the multicast Ethernet frame, the bridge element 120 may access the MCBC table 150 to retrieve address information for a multicast router associated with the multicast domain of the frame, for example, when a destination multicast address is not found in the LNVT table 402. The bridge element 120 broadcasts in the multicast domain through the multicast router identified by the multicast router entry 410, such that the Ethernet frame may reach the external entities.

In some embodiments, a MID 432 for a multicast group entry 408 that is associated with a given multicast domain may be determined based on an index provided by higher level processes or NOS. In one implementation, a multicast group MID may be calculated as $MID_{MC}=START\_ADDR_{MC}+i_{IGMP}$, where $START\_ADDR_{MC}$ represents a starting address for the block of multicast router entries 410 within the MCBC table 150, and $i_{IGMP}$ is some relative index within the multicast group partition of the MCBC table 150 as specified by a NOS. As such, when NOS seeks to update one or more multicast groups (e.g., according to IGMP), the NOS can provide the IOMC 140 with updated multicast group information and an index $i_{IGMP}$, which the IOMC 140 uses to retrieve and update the associated multicast group entry 408 having a $MID_{MC}=START\_ADDR_{MC}+i_{IGMP}$ within the MCBC table 150.

In some embodiments, a MID 432 for a multicast router entry 410 that is associated with a given VLAN and LN domain may be determined based on the values of the VLAN and LN domain. In some embodiments, a multicast router MID may be calculated as $MID_{MROUTER}=START\_ADDR_{MROUTER}\ (LN\_tag*N_{VLAN}\ VLAN\_tag)$, where the LN and VLAN domain is identified by numeric values LN_tag and VLAN_tag, $N_{VLAN}$ is the number of VLANs per LN, and $START\_ADDR_{MROUTER}$ represents a starting address for the block of multicast router entries 410 within the MCBC table 150. For example, in an implementation where each LN may be associated with any of 4,096 VLANs, and that the multicast router entries start after 32 k broadcast group entries 406 in the MCBC table, multicast router MIDs may be determined as $MID_{MROUTER}=32768+LN\_tag*4096+VLAN\_tag$.

In one embodiment, the MCBC table 150 includes a partition having a plurality of ACL rule entries 412 that specify destination ports that are associated with one or more ACL rules 422. An ACL rule 422 may specify that responsive to a match of one or more aspects of an Ethernet frame, one or more actions should be taken associated with a group of destination ports specified by a corresponding ACL rule entry 412. For example, upon receiving an Ethernet frame, a bridge element 120 may process an ACL rule 422 that matches a source address of the received Ethernet frame and that specifies the Ethernet frame should be forwarded to ports specified by MID #31051. The bridge element 120 may access the MCBC table 150 to retrieve an ACL rule entry 412 having the MID #31051, which specifies a group of destination ports associated with the ACL rule, and forwards the Ethernet frame as per the ACL rule 422. In some embodiments, the ACL rule entries 412 may be managed by an ACL subsystem, such as in a higher level processes (e.g., software) or NOS. In one implementation, an ACL rule entry MID may be calculated as $MID_{ACL}=START\_ADDR_{ACL}+i_{ACL}$, where $START\_ADDR_{ACL}$ represents a starting address for the block of ACL rule entries 412 within the MCBC table 150, and $i_{ACL}$ is some relative index within the ACL rule partition of the MCBC table 150 as specified by a NOS or ACL subsystem.

The MCBC table 150 may be further configured to include port membership entries for routing not just data frames, but also control frames, within the distributed network switch. For example, the MCBC table 150 may contain port membership information used to forward data frames for Spanning Tree Protocol, Fibre Channel over Ethernet, and other system rules.

In one embodiment, the MCBC table 150 includes a partition having a plurality of spanning tree group (STG) entries 414 that specify destination ports for control points (e.g., IOMCs 140) associated with managing a spanning tree model. For example, for each VLAN and LN group, IOMCs 140 and associated bridge elements exchange special control frames called Bridge Protocol Data Units (BPDU) having information about bridge element IDs and path costs to collectively compute a spanning tree. The group of communicating control points may be identified through a membership specified in the MCBC table 150. As such, upon receiving a BPDU frame having an STP multicast address as the destination address, a bridge element 120 may access the MCBC table 150 to retrieve a STG entry 414 specifying a group of destination ports of control points and associated bridge elements to which to forward the BPDU. In one implementation, a STG entry MID may be calculated as $MID_{STG} = START\_ADDR_{STG} + i_{STG}$, where $START\_ADDR_{STG}$ represents a starting address for the block of STG entries 414 within the MCBC table 150, and $i_{STG}$ is some relative index based on the STP multicast domain.

In one embodiment, the MCBC table 150 is configured to allocate a partition having a plurality of Fibre Channel over Ethernet (FCoE) rule entries 416. In some embodiments, the FCoE rule entries 416 may be managed by a higher level processes (e.g., software) or NOS. NOS may use the FCoE rule entries 416 to specify destination ports to support forwarding of Fibre Channel frames over Ethernet networks, for example, using an FCoE rule to specify a frame be sent directly using FCoE. In one implementation, a FCoE rule entry MID may be calculated as $MID_{FCoE} = START\_ADDR_{FCoE} + i_{FCoE}$, where $START\_ADDR_{FCoE}$ represents a starting address for the block of FCoE entries 416 within the MCBC table 150, and $i_{FCoE}$ is some index relative to the partition provided by higher level processes (e.g., software) or NOS.

In one embodiment, the MCBC table 150 includes a partition having a plurality of system rule entries 418 that specify destination ports associated with one or more system rules specified by the IOMC 140 (e.g., by firmware). The IOMC 140 may include one or more system rules used to configure to perform ancillary tasks during execution of the distributed network switch. For example, a system rule entry 418 may specify a group of ports that are re-direct ports. In one implementation, a system rule entry MID may be calculated as $MID_{system} = START\_ADDR_{system} + i_{system}$, where $START\_ADDR_{system}$ represents a starting address for the block of system rule entries 418 within the MCBC table 150, and $i_{system}$ is some index relative to the partition as provided by firmware.

In one embodiment, the remaining space in the MCBC table 150 not used for entries such as those described above may be organized into a partition of unused entries 420. For example, an MCBC table 150 configured to contain a maximum of 65,536 entries may have a partition of 32 k broadcast group entries 406, a partition of 16 k multicast router entries 410, a partition of 4 k multicast group entries 408, 1 k partitions for each of ACL rule entries 412, STG entries 414, FCoE rule entries 416, and system rule entries 418. In this example, the remaining 8 k entries form a partition of unused entries 420.

As described above, the IOMC 140 may increase the size of a partition of the MCBC table 150 by drawing from the partition of unused entries 420. For example, the IOMC 140 may increase the partition allocated to multicast group entries 408 by the size of the unused entry partition (e.g., by up to 8 k entries, to reach 12 k total entries) without disrupting the size of any other partitions. Should the multicast group entries 408 grow further, other partitions in the MCBC table would have to be reduced, as directed by a network administrator. In some embodiments, the other partitions may be reduced proportionally to accommodate an increased partition.

According to one embodiment, the MCBC table 150 may be modified automatically without network administrator involvement based on heuristics of usage. In another embodiment, the partitions of the MCBC table 150 may be allocated based on various configurations and network settings of the distributed network switch. For example, if the distributed network switch is configured to support 4,096 VLANs per logical network and up to 4 logical networks, the partition of broadcast group entries 406 may be modified to have 16 k entries (e.g., 4096*4). In another example, if the distributed network switch is configured to support a "trunk mode", then the partition of broadcast group entries 406 may be doubled (e.g., from 16 k entries to 32 k entries) to support this feature. In another example, if the distributed network switch is not expected to use a feature such as FCoE, the MCBC table 150 may be dynamically modified to reduce or otherwise eliminate the partition for FCoE rule entries 416.

Figure 5:
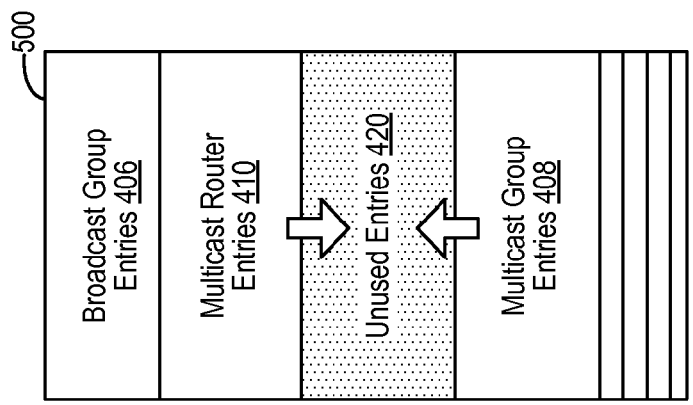
FIG. 5 is a block diagram illustrating an alternative embodiment of the multicast broadcast table shown in FIG. 4.

FIG. 5 illustrates a block diagram of an alternative embodiment of an MCBC table 500. Similar to the MCBC table 150, the MCBC table 500 includes a plurality of types of port membership information arranged into a plurality of partitions. In this embodiment, two types of port membership information (e.g., multicast router entries 410 and multicast group entries 408) are arranged at opposite ends of the MCBC table 150 with a partition of unused entries 420 disposed in between. As shown, one partition arranged at the top of the MCBC table (e.g., multicast router entries 410) may be configured to grow downwards, while the other partition arranged at the bottom of the MCBC table (e.g., multicast group entries 408) is configured to grow upwards. In this embodiment, the partitions may continue to grow until the partition of unused entries 420 is entirely depleted and the partitions collide.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable storage medium having computer-readable program code embodied therewith, the computer-readable program code comprising:
   computer-readable program code configured to receive a request indicating a partition size associated with a type of port membership information; and
   computer-readable program code configured to modify a port membership table based on the partition size, wherein the port membership table includes a first plurality of entries of a first type of port membership specifying port membership for multicast groups and a second plurality of entries of a second type of port membership specifying port membership for broadcast groups.

2. The non-transitory computer-readable storage medium of claim 1, wherein the computer-readable program code configured to modify the port membership table further comprises computer-readable program code configured to modify a number of entries of the type of port membership associated with the requested partition size.

3. The non-transitory computer-readable storage medium of claim 1, wherein an entry of the port membership table comprises a membership identifier and a plurality of destination ports associated with a corresponding port group.

4. The non-transitory computer-readable storage medium of claim 1, wherein the computer-readable program code configured to modify the port membership table further comprises computer-readable program code configured to modify a starting address within the port membership table of the type of port membership associated with the requested partition size.

5. The non-transitory computer-readable storage medium of claim 1, wherein the port membership table further comprises a plurality of unused entries, and wherein the computer-readable program code configured to modify further comprises:
   computer-readable program code configured to increase a number of entries of the type of port membership associated with the requested partition size; and computer-readable program code configured to decrease a number of the plurality of unused entries to maintain a total size of the port membership table.

6. The non-transitory computer-readable storage medium of claim 1, further comprising:
   computer-readable program code configured to receive an access request for a plurality of destination ports that are members of a port group; and
   computer-readable program code configured to retrieve an entry from the port membership table corresponding to the port group, wherein the retrieved entry specifies the plurality of destination ports that are members of the port group.

7. The non-transitory computer-readable storage medium of claim 6, wherein the computer-readable program code configured to retrieve further comprises computer-readable program code configured to determine a membership identifier associated with the port group according to a starting address associated with the first type of port membership.

8. A system for managing port membership information, comprising:
   one or more computer processors; and
   a memory containing a program which, when executed by the one or more computer processors, is configured to perform an operation comprising:
      receiving a request indicating a partition size associated with a type of port membership information; and
      modifying, by operation of the one or more computer processors, a port membership table based on the partition size, wherein the port membership table includes a first plurality of entries of a first type of port membership specifying port membership for multicast groups and a second plurality of entries of a second type of port membership specifying port membership for broadcast groups.

9. The system of claim 8, wherein the modifying further comprises:
   modifying a number of entries of the type of port membership associated with the requested partition size.

10. The system of claim 8, wherein the first plurality of entries indicates port membership for multicast groups, and wherein the second plurality of entries indicates port membership for broadcast groups.

11. The system of claim 8, wherein the modifying the port membership table further comprises:
   modifying a starting address within the port membership table of the type of port membership associated with the requested partition size.

12. The system of claim 8, wherein the modifying further comprises:
   receiving an access request for a plurality of destination ports that are members of a port group; and
   retrieving an entry from the port membership table corresponding to the port group, wherein the retrieved entry specifies the plurality of destination ports that are members of the port group.

13. The system of claim 12, wherein the retrieving further comprises:
   determining a membership identifier associated with the port group according to a starting address associated with the first type of port membership.

* * * * *